US009512289B2

(12) United States Patent
Tanaka et al.

(10) Patent No.: US 9,512,289 B2
(45) Date of Patent: Dec. 6, 2016

(54) ANISOTROPIC HEAT CONDUCTIVE COMPOSITION

(71) Applicant: Panasonic Corporation, Kadoma-shi, Osaka (JP)

(72) Inventors: Atsushi Tanaka, Osaka (JP); Naomi Nishiki, Kyoto (JP); Kazuhiro Nishikawa, Osaka (JP); Hidetoshi Kitaura, Osaka (JP); Kimiaki Nakaya, Osaka (JP); Honami Nawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/303,839

(22) Filed: Jun. 13, 2014

(65) Prior Publication Data
US 2014/0374648 A1 Dec. 25, 2014

(30) Foreign Application Priority Data

Jun. 25, 2013 (JP) ................................. 2013-132232

(51) Int. Cl.
*B23B 27/00* (2006.01)
*C09K 5/00* (2006.01)
*C08K 3/04* (2006.01)

(52) U.S. Cl.
CPC ........... *C08K 3/04* (2013.01); *C08K 2201/003* (2013.01); *C08K 2201/004* (2013.01)

(58) Field of Classification Search
None
See application file for complete search history.

(56) References Cited

U.S. PATENT DOCUMENTS

| | | | |
|---|---|---|---|
| 5,449,507 A * | 9/1995 | Murakami et al. | 423/448 |
| 5,863,467 A * | 1/1999 | Mariner et al. | 252/511 |
| 2007/0091611 A1 | 4/2007 | Hwang | |
| 2011/0014417 A1 | 1/2011 | Lemak et al. | |

FOREIGN PATENT DOCUMENTS

| | | | | |
|---|---|---|---|---|
| CN | 1955807 A | 5/2007 | | |
| CN | 102575914 A | 7/2012 | | |
| CN | 103160134 A | 6/2013 | | |
| JP | 2007-106902 | * 4/2007 | | C08L 101/00 |
| JP | 2007-224265 | 9/2007 | | |
| JP | 2009-149769 | * 7/2009 | | C08L 21/00 |

OTHER PUBLICATIONS

Office Action issued in corresponding Chinese Patent Application No. 201410218491.7 on Jan. 28, 2016.

* cited by examiner

*Primary Examiner* — David Sample
*Assistant Examiner* — Nicole T Gugliotta
(74) *Attorney, Agent, or Firm* — Hamre, Schumann, Mueller & Larson, P.C.

(57) ABSTRACT

An object of the present invention is to provide an anisotropic heat conductive composition comprising: resin; and graphite fillers dispersed into the resin, wherein the graphite fillers each have a maximum diameter A in parallel with a basal plane of each of the graphite fillers and a maximum length C perpendicular to the basal plane, an average of the maximum diameters A ranges from 1 μm to 300 μm, an average ratio of the maximum diameter A to the maximum length C represented by A/C is at least 30, a content of the graphite fillers is 20 mass % to 40 mass %, and an average of a smaller angle made by the basal plane and a sheet surface of the sheet anisotropic heat conductive composition is less than 15°.

6 Claims, 3 Drawing Sheets

ANISOTROPIC HEAT CONDUCTIVE COMPOSITION

FIELD OF THE INVENTION

The present invention relates to an anisotropic heat conductive composition having high heat conductivity and flexibility.

BACKGROUND OF THE INVENTION

With an increase in the number of semiconductor devices packed on a single printed circuit board, more importance is being placed on the issue of heat dissipation from printed circuit boards having thereon heat-generating electronic components. For a heat-dissipating mechanism, creation of a heat conductive path for connecting a high temperature region to a low temperature region has been proposed.

Various heat-dissipating sheets have been developed as products having such a heat conductive path formed therein. A heat-dissipating sheet is required to have steady levels of heat conductivity, strength, and shielding ability. Therefore, to improve heat conductivity and other properties of a heat-dissipating sheet, a composition comprising a graphite material is being considered for use in sheet form.

For example, Japanese Patent Laid-Open No. 2007-224265 proposes a heat conductive composition comprising: graphite particles having an aspect ratio in a range of 10 to 20, and an average particle size of 10 µm to 200 µm; and a matrix of thermosetting resin with the particles dispersed therein.

Generally, the heat conductivity of a composition improves with an increase in graphite particle content. However, as a graphite particle content increases, the flexibility of the composition may decrease or a sheet formed by the composition may become fragile.

If a compact formed by the composition is used for dissipating heat from electronic equipment, the compact is used between objects. If the compact has high hardness, the compact cannot absorb the surface roughness of the objects because of its low flexibility. Thus, air on the surfaces of the objects reduces a heat transfer rate.

Hence, an improvement in the heat transfer rate of the composition is limited only by dispersing graphite particles into the matrix of thermoplastic resin as described in Japanese Patent Laid-Open No. 2007-224265.

In view of the circumstances, an object of the present invention is to provide an anisotropic heat conductive composition having high heat conductivity and flexibility.

DISCLOSURE OF THE INVENTION

An anisotropic heat conductive composition according to the present invention is a sheet anisotropic heat conductive composition comprising: resin; and graphite fillers dispersed into the resin, wherein the graphite fillers each have a maximum diameter A in parallel with a basal plane of each of the graphite fillers and a maximum length C perpendicular to the basal plane, an average of the maximum diameters A ranges from 1 µm to 300 µm, an average ratio of the maximum diameter A to the maximum length C represented by A/C is at least 30, a content of the graphite fillers is 20 mass % to 40 mass %, and an average of a smaller angle made by the basal plane and a sheet surface of the sheet anisotropic heat conductive composition is less than 15°.

The content of graphite filler is small, specifically, 20 mass % to 40 mass % while the graphite filler is oriented at an angle smaller than 15° in one direction, achieving an anisotropic heat conductive composition having high heat conductivity and flexibility.

DESCRIPTION OF THE EMBODIMENT

An embodiment of the present invention will be described below with reference to the accompanying drawings. An anisotropic heat conductive composition according to the present embodiment contains resin and a flake graphite filler dispersed into the resin, the flake graphite filler being oriented in one direction.

<Shape of the Flake Graphite Filler>

Figure 1:
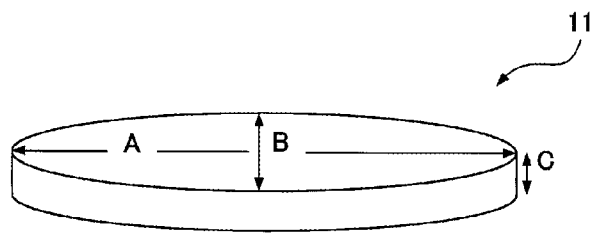
FIG. 1 is a schematic diagram showing the shape of a flake graphite filler.

The flake graphite filler has a shape illustrated in FIG. 1. A flake graphite filler 11 has a basal plane having regularly spaced carbons. In FIG. 1, the basal plane has a long side A and a short side B. A thickness C is perpendicular to the basal plane.

The long side A is the maximum value of the length of the graphite filler 11 on the basal plane. The short side B is the maximum value of the width of the flake graphite filler 11 and is perpendicular to the long side A. The ratio (i.e., aspect ratio) of the long side A to the short side B may be 1. In this case, the long side A and the short side B are interchangeable. Furthermore, as illustrated in FIG. 1, the thickness C of the flake graphite filler is a maximum diameter in the direction perpendicular to the basal plane.

Figure 2:
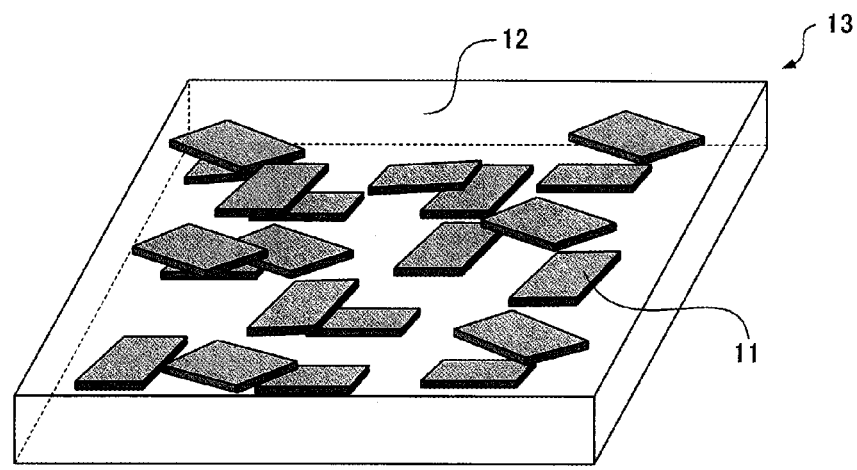
FIG. 2 is a schematic diagram showing an orientation state of the flake graphite filler in an anisotropic heat conductive composition according to the present invention.

FIG. 2 is a perspective view of an anisotropic heat conductive composition 13 according to the present embodiment. The anisotropic heat conductive composition 13 contains the flake graphite filler 11 and resin 12 for dispersing the flake graphite filler 11.

A shear force or a pressure applied to the anisotropic heat conductive composition 13 orients the flake graphite filler 11 in parallel with or perpendicularly to the applied force. The oriented flake graphite filler 11 causes the anisotropic heat conductive composition 13 to have high heat conductivity in the orientation direction of the flake graphite filler 11. For example, in the pressure molding of the anisotropic heat conductive composition 13, the basal plane of the flake graphite filler 11 is perpendicular to a pressing direction and is oriented in parallel with a surface of the anisotropic heat conductive composition 13, that is, a pressing surface. This achieves high heat conductivity in parallel with the surface of the anisotropic heat conductive composition 13.

The anisotropic heat conductive composition 13 is suitable as a heat-dissipating sheet that forms a heat conductive path connecting a high temperature part and a low temperature part on, for example, a mounting substrate having a heat-generating electronic component.

<Used Flake Graphite Filler 11>

For example, the ratio of the long side A to the thickness C of the used flake graphite filler 11 is preferably at least 30 while the long side A is preferably 1 µm to 300 µm. Moreover, the ratio of the long side A to the short side B is preferably 1 to 30.

The flake graphite filler 11 having such a shape can improve contact and heat conductivity between particles. The shape is merely a preferable example and thus the present invention is not limited to this shape.

If the ratio of the long side A to the thickness C exceeds 30, a contact point between the flake graphite fillers 11 is reduced so as to lessen the effect of improved heat conductivity.

If the long side a is 1 µm or less, the orientation may become difficult in rubber. If the long side A is 300 µm or larger, the dispersion may decrease. If the ratio of the long side A to the short side B is at least 30, it is difficult to keep the shape of the flake graphite filler 11 in a rubber component.

When the flake graphite fillers 11 have a particular shape as defined above, there is a higher probability of the flake graphite fillers 11 coming in contact with one another when they are oriented in one direction; and there is a larger contact area between the particles at their contact point. Therefore, a heat conductive path can be created with efficiency. All the flake graphite fillers 11 do not need to have the dimensions as long as the average value of the dimensions of randomly extracted twenty of the flake graphite fillers 11 is within the range of dimensions or at least one of the flake graphite fillers 11 has the dimensions. The dimensions of the flake graphite fillers 11 are measured by a scanning microscope.

<Preparation of the Flake Graphite Filler 11>

The components of the anisotropic heat conductive composition of the present invention will be more specifically described below. If the long side A of the flake graphite filler is 1 µm to 300 µm and the ratio of A to C is at least 30, the flake graphite filler can be obtained by, for example, pulverizing a graphite film.

Alternatively, natural graphite may be worked into flakes such that the long side A is 1 µm to 300 µm and the ratio of A to C is at least 30. The flake graphite filler 11 of one type may be used alone. The flake graphite fillers 11 of several types may be mixed and used as long as the ratio of the long side A to the thickness C satisfies the conditions.

A graphite film can be obtained by graphitizing a polymer film by baking it at a high temperature of 2,400° C. or higher and preferably 2,600° C. to 3,000° C. in an inert gas atmosphere. The baking may be performed in a single step; or in two or more steps with a change in temperature for each step. The inert gas is not particularly limited, but is preferably nitrogen or argon due to low cost. Baking time is not particularly limited, but is preferably, for example, 2 to 6 hours.

The thickness of the polymer film before graphitization may be selected as appropriate in accordance with the thickness C of the flake graphite filler 11; but is, for example, 400 µm or less, and preferably 10 µm to 200 µm. This is because the high-polymer film having a thickness of 10 µm to 200 µm evenly receives heat and elements other than carbon are easily removed.

Thus, graphite can be obtained with high crystallinity. If the thickness of the high-polymer film is smaller than 10 µm, the high-polymer film is destroyed when elements other than carbon are removed as gas. If the thickness of the high-polymer film is larger than 200 µm, elements other than carbons are gasified and are forcibly discharged out of the high-polymer film, causing damage to the high-polymer film.

Even when the polymer film, i.e., a starting material, is comparatively thick, it is all the more possible to obtain thin flake graphite fillers. This is because the graphite of the graphite film is exfoliated into individual layers, when the graphite film is pulverized.

If the thickness of the polymer film is larger than 400 µm, heat is less likely to be evenly applied into the film, reducing the crystallinity of graphite. If the thickness of the polymer film is smaller than 10 µm, the film is destroyed by heat treatment.

Examples of a material for the polymer film, considered preferable, include: polyimide, polyamide imide, polyoxadiazole, polybenzothiazole, polybenzobisthiazole, polybenzoxazole, polybenzobisthiazole, polyparaphenylene isophthalamide, polymetaphenylene benzimidazole, polyphenylene benzobisimidazole, polythiazole, and polyparaphenylene vinylene. These materials are formed into a film.

According to a method of preparing the flake graphite filler 11 by heat-treating the high-polymer film, the flake graphite filler can be obtained with maximum heat conductivity. Moreover, the graphite fillers can be easily worked with uniform grain sizes.

This method is not particularly limited. These materials may be used singly, or in a combination of two or more. For example, two or more different kinds of films may be graphitized, pulverized, and then mixed; or two or more different kinds of materials, composed or alloyed in advance, may be formed into a film and then graphitized.

The obtained graphite film is pulverized to obtain flake graphite fillers. The method used for pulverization is not particularly limited. However, it is preferable that the graphite particles are made to collide against one another, or that the graphite particles are made to physically collide against a hard material serving as a medium. Examples of the method used for pulverization include ball milling, nanomizing, and jet milling.

The thickness of the graphite film to be pulverized may be selected as appropriate in accordance with the intended thickness C of the flake graphite filler.

In the case of processing natural graphite, it is preferable that natural graphite is pretreated by having it immersed in sulfuric acid and then heated, thereby causing layers therein to expand. After the treatment, a shear force is applied to the expanded graphite, accelerating exfoliation between the layers. Thus, a flake filler can be easily obtained with a large ratio of a to c.

<Resin 12>

The component of the resin 12 is not particularly limited. Various thermoplastic resins or elastomers may be used. Alternatively, a mixture of thermoplastic resin not having rubber elasticity and an elastic elastomer may be used.

Examples of the thermoplastic resin include: styrene copolymers such as styrene-acrylonitrile copolymer, styrene-maleic anhydride copolymer, and (meth)acrylate ester-styrene copolymer; rubber reinforcing resins such as ABS resin and AES resin; olefin polymers such as polyethylene, polypropylene, ethylene-vinyl acetate copolymer, ethylene-vinyl alcohol copolymer, and chlorinated polyethylene; vinyl chloride polymers such as polyvinyl chloride, ethylene-vinyl chloride polymer, and polyvinylidene chloride; (meth)acrylate ester polymers such as polymethyl methacrylate; imide polymers such as polyamide, polyimide, polyamide-imide, and polyetherimide; polyester polymers such as polyethylene terephthalate and polybutylene terephthalate; polyacetal; polycarbonate; polyarylate; polyphenylene ether; polyphenylene sulfide; fluorine resins such as polytetrafluoroethylene and polyvinylidene fluoride; ketone polymers such as polyetherketone and polyether ether ketone; sulfone polymers such as polysulfone and polyethersulfone; urethane polymers; and polyvinyl acetate.

These may be used singly, in a combination of two or more, or in an alloy material of two or more.

The elastomer is not particularly limited, and examples thereof include chloroprene rubber, isoprene rubber, natural rubber, styrene-butadiene rubber, butadiene rubber, butyl rubber, ethylene-propylene rubber, ethylene-propylene-diene rubber (EPDM), nitrile rubber, urethane rubber, acrylic rubber, silicone rubber, fluorine rubber, and hydrogenated nitrile rubber. These may be used singly, or in a combination of two or more.

<Additives>

The anisotropic heat conductive composition 13 of the present invention can include various additives, in addition to the flake graphite fillers 11 and the resin 12. Various additives are used, particularly when the anisotropic heat conductive composition 13 is a rubber composition which includes an elastomer.

The additives for the rubber composition are not particularly limited, and examples thereof include a cross-linking agent for producing cross-links among the rubber components, a carbon black (e.g., Ketjen black, acetylene black) for improving the mechanical strength of the rubber components, and a moderate amount of plasticizer for adjusting rubber hardness. In addition to the above, a secondary vulcanizing agent such as stearic acid, an antioxidant, oil, a lubricant, and/or inorganic particles (e.g., silica particles, alumina particles), for example, can be added to the composition, as appropriate.

For the cross-linking agent, a sulfur-based cross-linking agent (vulcanizing agent), a peroxide, or the like is preferably added in moderate amounts to the composition. When a silicone rubber is used in the matrix resin component, a curing agent for curing silicone (e.g., a tertiary amine compound) is preferably added. Moreover, a curing accelerator such as zinc oxide, active zinc oxide, or the like may be added in moderate amounts to the composition.

Examples of a flame retardant include an organic flame retardant, an inorganic flame retardant, and a reactive flame retardant. The retardants may be used singly or at least two of the retardants may be combined. Examples of the organic flame retardant include a halogen flame retardant such as a brominated epoxy compound, a brominated alkyltriazine compound, a brominated bisphenol epoxy resin, a brominated bisphenol phenoxy resin, a brominated bisphenol polycarbonate resin, a brominated polystyrene resin, a brominated crosslinked polystyrene resin, a brominated bisphenol cyanurate resin, a brominated polyphenylene ether, a decabromodiphenyl oxide, tetrabromobisphenol A, and an oligomer thereof; and a phosphoric acid ester such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, cresyl diphenyl phosphate, dicresyl phenyl phosphate, dimethyl ethyl phosphate, methyl dibutyl phosphate, ethyl dipropyl phosphate, and hydroxyphenyl diphenyl phosphate.

The examples further include a phosphorus flame retardant such as a compound obtained by modifying these compounds with various substituents, various condensed phosphoric acid ester compounds, and a phosphazene derivative containing phosphorus and nitrogen elements; and polytetrafluoroethylene. The compounds may be used singly or at least two of the retardants may be combined.

Examples of the inorganic flame retardant include aluminum hydroxide, antimony oxide, magnesium hydroxide, zinc borate, a zirconium compound, a molybdenum compound, zinc stannate, guanidine salt, a silicone compound, and a phosphazene compound. These compounds may be used singly or at least two of the compounds may be combined.

Examples of the reactive flame retardant include tetrabromobisphenol A, dibromophenol glycidyl ether, brominated aromatic triazine, tribromophenol, tetrabromophthalate, tetrachlorophthalic anhydride, dibromoneopentyl glycol, poly(pentabromobenzyl polyacrylate), chlorendic acid (HET acid), chlorendic anhydride (HET anhydride), brominated phenol glycidyl ether, and dibromocresyl glycidyl ether. These compounds may be used singly or at least two of the compounds may be combined.

The amount of the additives is preferably 30 mass % or less of the overall anisotropic heat conductive composition. This is because, due to the moderate amount of the additives, quantitative balance is maintained between the flake graphite fillers and the matrix resin, thus enabling the composition to easily maintain good heat conductivity and to easily secure moldability and strength.

<Method of Manufacturing the Anisotropic Heat Conductive Composition 13>

First, the anisotropic heat conductive composition 13 is prepared. The method of preparation is not particularly limited. The component of the resin 12, the flake graphite fillers 11, and, as necessary, the additives to be included in the composition may be blended and kneaded in an appropriate order.

However, if the elastomer (rubber component) is used as the component of the resin 12, it is desirable to first knead materials other than a rubber cross-linking agent to prevent heat generated during kneading from developing cross-linking of the rubber and then knead the materials again with the rubber cross-linking agent.

In the case of kneading of the materials, for example, two-roll mixing is used. In two-roll mixing, the composition is molded into a sheet through a gap between a pair of rolls. As the composition is nipped between the rolls and passed through the gap therebetween, a shear force is applied to the composition by the rotating rolls, and the composition is elongated in parallel with the shear force.

At this time, along with the elongation of the matrix resin, the flake graphite fillers 11 dispersed in the composition is oriented in the same direction. Hence, the basal plane of the flake graphite filler 11 is successfully oriented in parallel with the surface of the sheet. To enhance the orientation of the flake graphite filler 11, the sheet is preferably passed through the rolls multiple times.

Moreover, in the case where the sheet sticks onto one of the rolls when coming out from between the rolls, the sheet is preferably separated from that roll, reversed, and then passed through the rolls again.

Before kneading the composition by two-roll mixing, the materials may be pre-kneaded using known mixers, for example, a twin screw extruder, a single screw extruder, a twin or single screw feeder capable of applying heat, a feeder ruder, a Banbury mixer, and a roll mill.

Subsequently, the composition is molded into an anisotropic heat conductive composition 13 having a desired thickness. The manner of molding the anisotropic heat conductive composition 13 is not particularly limited as long as the thickness of the anisotropic heat conductive composition 13 can be adjusted. For example, calendaring is preferable because a sufficient pressure is applied in the thickness direction of the anisotropic heat conductive composition 13 and the basal plane of the flake graphite filler 11 is easily oriented in parallel with the surface of the sheet.

Typically, calendaring is suited for continuous production. In the calendaring process, a composition is fed to at least a pair of rollers to form an anisotropic heat conductive composition 13, which is then taken out by a take-up roll. The sheet thickness of the anisotropic heat conductive composition 13 can be made more precise, by rolling the composition between heated rolls and then between cold rolls, at a preliminary stage in the process.

Alternatively, the composition may be extruded after it is sufficiently kneaded by an internal mixer such as a Banbury mixer. In extrusion, a composition is successively pushed out of a metal nozzle or die that matches with the shape of the anisotropic heat conductive composition 13, thereby to form the anisotropic heat conductive composition 13. During extrusion, a shear force is applied to the composition in the extrusion direction, causing the flake graphite filler 11 to be oriented in parallel with the surface of the anisotropic heat conductive composition 13. The extruded anisotropic heat conductive composition 13 may further undergo pressing between calendar rolls.

When the composition includes the rubber component, it is heated as necessary to promote cross-linking (vulcanization) by the cross-linking agent, thereby to obtain a sheet with excellent flexibility and strength. Thereafter, the sheet is cut in a direction perpendicular to its plane, thereby to obtain a product having an intended shape of a heat-dissipating sheet.

It is also possible to promote cross-linking of the rubber component, by applying sufficient heat energy to the composition while it is being passed between the heat rolls in calendaring.

<The Orientation of the Flake Graphite Filler>

FIG. 2 schematically depicts the inner structure of the anisotropic heat conductive composition molded into a sheet. The anisotropic heat conductive composition 13 contains the resin 12 and the flake graphite fillers 11 dispersed in the resin 12.

Inside the anisotropic heat conductive composition 13 produced in the aforementioned manner, the flake graphite filler is oriented such that the basal plane of the flake graphite filler and a direction parallel to a surface of the anisotropic heat conductive composition 13 both face roughly the same direction, as illustrated in FIG. 2. Such orientation of the flake graphite filler can be confirmed by observing a section of the anisotropic heat conductive composition 13 under a scanning electron microscope, the section being perpendicular to the surface of the anisotropic heat conductive composition 13.

<Evaluation of Orientation>

Figure 3:
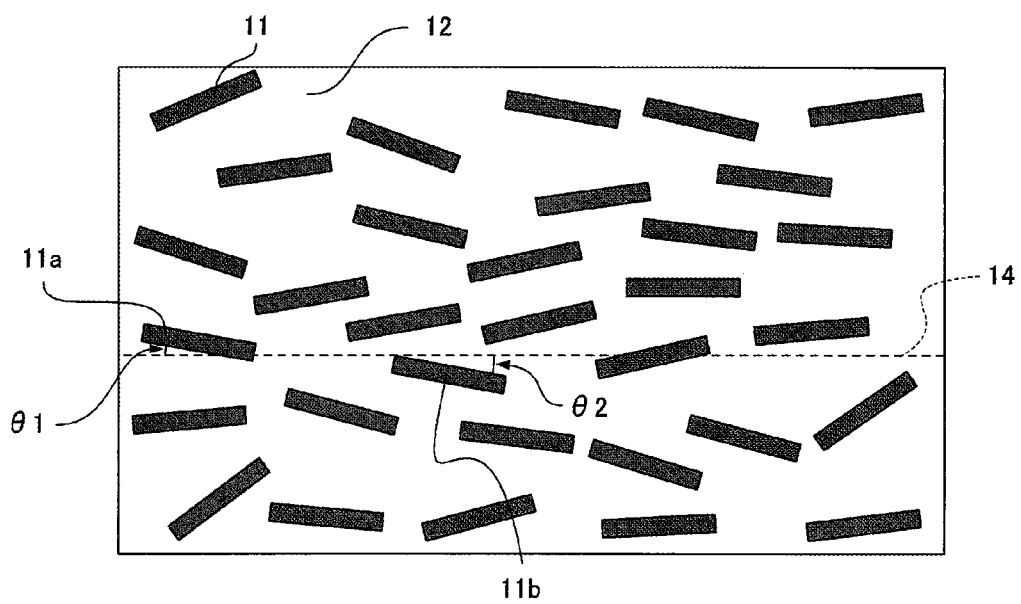
FIG. 3 is a schematic diagram showing a method of evaluating the orientation state of the flake graphite filler.

FIG. 3 schematically depicts the section of the anisotropic heat conductive composition 13 illustrated in FIG. 2, the section being perpendicular to the surface of the anisotropic heat conductive composition 13. A broken like in FIG. 3 is a reference line 14 for measuring the extent of orientation of the flake graphite filler 11, the reference line 14 optionally drawn parallel to the surface of the sheet.

The extent of orientation of the flake graphite filler 11 is smaller one of angles formed by the flake graphite filler 11 and the reference line 14 when the lower end of the flake graphite filler 11 is placed on the reference line 14 parallel to the top and bottom surfaces of the anisotropic heat conductive composition 13.

Specifically, in FIG. 3, an angle θ1 formed by a direction parallel to the surface of a flake graphite filler 11a and the reference line 14 is an angle θ while an angle θ2 formed by a flake graphite filler 11b and the reference line 14 is also the angle θ. In this case, the angle θ1 and the angle θ2 vary between clockwise and counterclockwise rotations. Since the flake graphite fillers 11 are originally contained in the anisotropic heat conductive composition 13 in a random fashion, the angles appear in the clockwise and counter-clockwise directions with substantially the same probability. Thus, if the angles θ1 and θ2 are equal to each other, the flake graphite fillers 11a and 11b can have the same extent of orientation.

Here, the angle θ created by the basal plane of the flake graphite filler 11 and the plane of the anisotropic heat conductive composition 13 is preferably 1° to 10°. The setting of the angle θ at 1° or larger can obtain a sufficient number of contact points between the flake graphite fillers 11 in the thickness direction, achieving a sheet with high heat conductivity.

Moreover, the setting of the angle θ at 10° or less orients the flake graphite filler 11 so as to obtain sufficiently large heat conductivity in parallel with the surface of the anisotropic heat conductive composition 13; meanwhile, heat conductivity is suppressed in the thickness direction of the sheet.

The angle θ in the present embodiment is the average value of 20 flake graphite fillers 11. Specifically, the 20 fillers are arbitrarily selected from the flake graphite fillers 11 observed in the section perpendicular to the surface of the sheet, the angle θ may be measured for each of the 20 fillers, and then, the angles θ of the 20 fillers may be averaged out. However, at least one of the flake graphite fillers 11 may have the mentioned angles.

In the following, a more detailed description will be given of the present invention based on Examples. However, note that the present invention is not limited by the following Examples.

Examples 1 to 3

(1) Production of Flake Graphite Fillers 11

A polyimide film (Kapton film, available from Du Pont-Toray Co., Ltd.) 25 μm in thickness was heat treated for 4 hours at 2,600° C. in an argon gas atmosphere, thereby to obtain a graphite film. The obtained graphite film was then pulverized for 15 minutes, by using a jet mill. The number of rotations by the classifier during pulverization, was 7,000.

The above resulted in obtaining flake graphite fillers 11 having a shape with the following parameter values. The long side A was 17 μm. The ratio of the long side A to the thickness C was at least 30. The long side A was 1 μm to 300 μm. The ratio of the long side A to the short side B was 1 to 20.

(2) Preparation of Anisotropic Heat Conductive Composition 13

The obtained flake graphite fillers 11, EPDM (Esprene, available from Sumitomo Chemical Co., Ltd.), peroxide serving as a cross-linking agent, and stearic acid were mixed together. The resultant mixture was sufficiently kneaded by a two-roll mixer with 8-inch diameter rolls to prepare the anisotropic heat conductive composition 13; meanwhile, the flake graphite fillers 11 in the composition were oriented in parallel with the surface.

Table 1 shows the obtained anisotropic heat conductive compositions 13. The anisotropic heat conductive compositions 13 were further heated at 170° C. for ten minutes to accelerate vulcanization. Table 1 also shows the evaluation results.

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Graphite content | 30 | 30 | 40 | 10 | 20 | 30 | 30 | 30 | 40 | 50 |
| Extent of orientation [°] | 7 | 10 | 9 | 10 | 30 | 15 | 30 | 45 | 30 | 30 |
| Heat conductivity [W/mk] | 10.5 | 10.1 | 20.1 | 0.9 | 3.1 | 6.4 | 5.3 | 5.1 | 8.2 | 24 |
| Rubber hardness [shore A] | 35 | 35 | 40 | 25 | 36 | 34 | 34 | 34 | 42 | 70 |
| Pass/fail result | OK | OK | OK | NG | NG | NG | NG | NG | NG | NG |

Comparative Examples 1 to 7

The anisotropic heat conductive compositions 13 were prepared as in the first to third embodiments and then were molded on conditions that the extents of orientation in Table 1 were obtained.

<Evaluations of Orientation>

In the anisotropic heat conductive compositions 13 obtained in these examples, the extents of orientation of the flake graphite fillers 11 are determined by a horizontal line optionally drawn on an image of a cut face observed under a scanning electron microscope after the anisotropic heat conductive compositions 13 are cut.

<Evaluation of Heat Conductivity>

For the Examples and Comparative Examples, heat diffusivity in the anisotropic heat conductive composition 13 was measured. Here, a heat diffusivity a was measured by periodic heating, using a thermowave analyzer (TA3, available from Bethel Co., Ltd.)

A 30 mm×30 mm sample was cut out from the anisotropic heat conductive composition 13, and then put on a sample stage for measurement.

The anisotropic heat conductive composition 13 was periodically irradiated with laser, i.e., heat wave, at a frequency of 0.5 Hz to 3 Hz; and the phase difference between the heat waves were read, while the position for measurement was moved to a point 4 mm from the irradiated area. Next, a graph was created, the horizontal axis having distance plotted thereon, and the vertical axis having phase difference plotted thereon; and an inclination in the graph was obtained. The heat diffusivity a was obtained from the inclination, by using Formula 1.

$$\alpha = \frac{\pi f}{s^2}$$

α: heat diffusivity
f: frequency
s: inclination in the graph
(Formula 1)

Heat conductivity λ is determined by Formula 2 below:

$$\alpha = \frac{\lambda}{\rho h}$$

α: heat diffusivity
λ: heat conductivity
ρ: density
h: specific heat
(Formula 2)

Table 1 shows the measurement results of the anisotropic heat conductive compositions 13 in the examples and comparative examples. The larger the graphite content, the higher the heat conductivity. The heat conductivity needs to be at least 6.5 W/m·k for the use of a heat dissipating sheet.

<Rubber Hardness>

A penetrator (called an indenter point or an indenter) was pressed to the surface of the anisotropic heat conductive composition 13 and then a deformation (indentation) was measured and converted into a number by means of a durometer (spring-type rubber hardness meter). The durometer measured the deformation like a type-A durometer of JIS, K6253. Table 1 shows the measurement results of the anisotropic heat conductive compositions 13 in the examples and the comparative examples.

Table 1 proves that rubber hardness increases with the graphite content. The higher the rubber hardness, the lower the mechanical strength of the sheet. Rubber hardness considerably affects heat conductivity on a contact surface. A graphite content of at least 50 wt % leads to excessive rubber hardness. Thus, the graphite content needs to be 40 wt % or less.

<Examination of Results>

Figure 4:
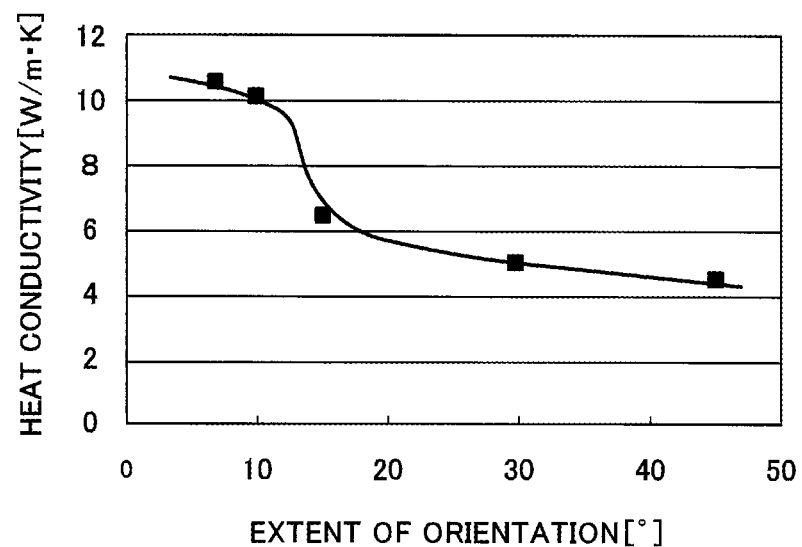
FIG. 4 shows the relationship between a degree of orientation and heat conductivity.

FIG. 4 shows the extent of orientation and heat conductivity of the anisotropic heat conductive composition 13 containing 30 wt % of flake graphite fillers 11. The horizontal axis indicates the extent of orientation while the vertical axis indicates heat conductivity. FIG. 4 proves that the heat conductivity increases when the extent of orientation is kept at 10° or less. The heat conductivity irregularly changes when the extent of orientation is 10° to 15°. Even if the extent of orientation is kept smaller than 10°, the heat conductivity is not considerably improved. This is because heat is sufficiently transmitted in parallel with the surface at 10° or less. Thus, the extent of orientation kept smaller than 10° is not effective. Thus, the extent of orientation needs to be smaller than 15°.

Figure 5:
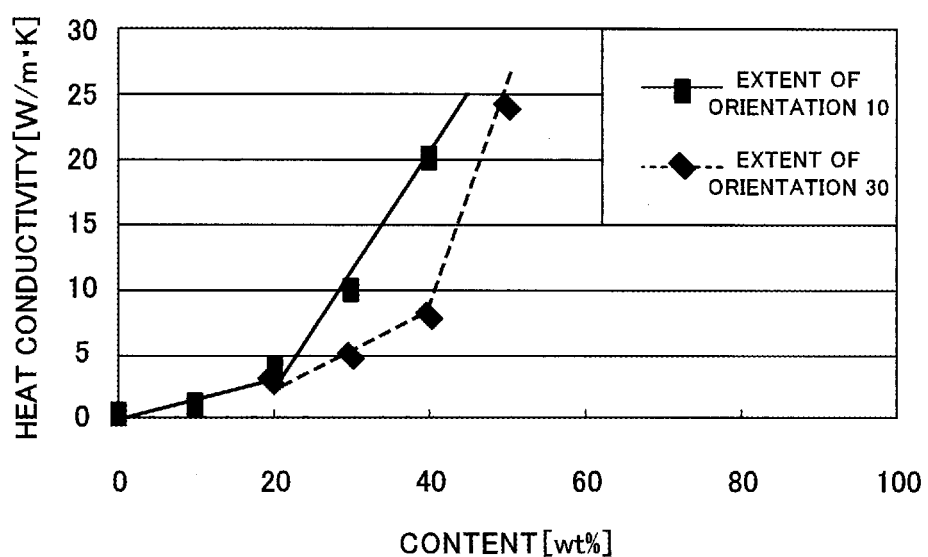
FIG. 5 shows the relationship between a graphite content and heat conductivity.

FIG. 5 shows the anisotropic heat conductive composition 13 with the extent of orientation at 10° or less and the anisotropic heat conductive composition 13 with the extent of orientation at 30° or less. The horizontal axis indicates a graphite content while the vertical axis indicates heat conductivity. FIG. 5 proves that when the extent of orientation is 30° or less, the graphite content needs to be at least 40 wt % to improve the heat conductivity, whereas when the extent of orientation is 10° or less, high heat conductivity is obtained even in a region where the graphite content is at least 20 wt %. Hence, the content of the flake graphite fillers 11 needs to be at least 20 wt %. If the extent of orientation is 15° or less, heat conductivity may be estimated to be similar to the case where the extent of orientation is 10° or less.

Since necessary heat conductivity is 6.5 W/m·k, the content of the flake graphite fillers 11 needs to be at least 22 wt % as shown in FIG. 5. Therefore, the content of the flake graphite fillers 11 needs to be at least 20 wt %, more preferably at least 25 wt %.

<Evaluation of Efficiency>

Figure 6A:
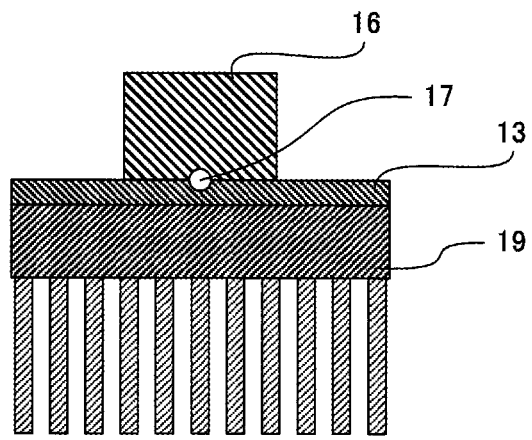
FIGS. 6A and 6B are front and side views schematically depicting an effect examination tool.
Figure 6B:
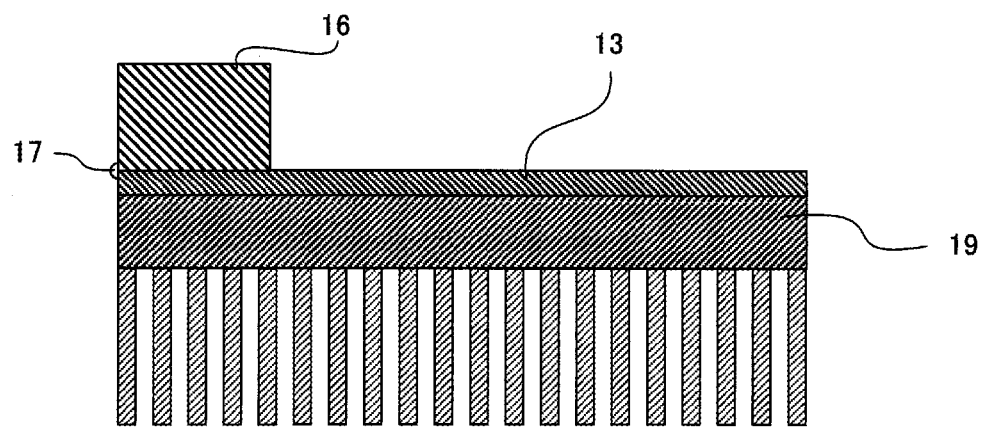

Whether the obtained anisotropic heat conductive composition 13 can efficiently transfer heat or not was examined using a simple effect examination tool. FIGS. 6A and 6B are schematic diagrams of the effect examination tool. FIG. 6A is a front view. FIG. 6B is a side view.

The obtained anisotropic heat conductive composition 13 was interposed between a heat source 16 and a cooling part 19, and then the temperature of a measurement point 17 between the heat source 16 and the anisotropic heat conductive composition 13 was measured by a thermocouple. The heat source 16 heated at a constant temperature was placed on the anisotropic heat conductive composition 13, and then the degree of cooling of the heat source 16 was measured after a certain period of time.

The effects were examined for the anisotropic heat conductive composition 13 of Example 3 and the anisotropic heat conductive composition 13 of Comparative Example 7. It was confirmed that the heat conductivity of Example 3 was lower than that of the sample of Comparative Example 7 but an enhanced cooling effect was obtained in Example 3. The graphite content and the rubber hardness are reduced to absorb the surface roughness of the heat source 16 and the cooling part 19 with the flexibility of the anisotropic heat conductive composition 13. This proved that the heat conductivity could be improved with the enhanced cooling effect on a contact surface.

<Overall Result>

Consequently, the graphite content needs to be 20% to 40% while the extent of orientation needs to be 10° or less.

In the anisotropic heat conductive composition 13 molded like a sheet, the smaller angle θ formed by the basal plane of the flake graphite filler 11 and the surface of the sheet is preferably 1° to 10°. The flake graphite filler with the a to c ratio of at least 10 is oriented with the angle θ of 10° or less, achieving a molded article with extremely high anisotropic heat conduction.

Moreover, the content of the flake graphite fillers in the overall anisotropic heat conductive composition is controlled at 20 mass % to 40 mass %. Within the range of contents, a highly flexible molded body can be obtained even if a filler is added. This is because the characteristics of a matrix are maintained.

Such a sheet is suitable as a heat-dissipating sheet that has a heat conductive path connecting a high temperature part and a low temperature part on, for example, a mounting substrate having a heat-generating electronic component.

The anisotropic heat conductive composition according to the present invention is a flexible sheet having high heat conductivity. The sheet is suitably used for transferring heat. Furthermore, because of these features, the anisotropic heat conductive composition can be expected to be useful for a fiber reinforcing member, a heat dissipating member, a phase changing member, a photoluminescent pattern member, a gas barrier member, a conductive member, an insulating member, a low-linear expansion member, or methods of manufacturing the same.

What is claimed is:

1. A sheet anisotropic heat conductive composition, comprising:
   resin;
   graphite fillers dispersed into the resin; and
   an elastomer,
   wherein
   the graphite fillers each have a maximum diameter A in parallel with a basal plane of each of the graphite fillers, a maximum diameter B in parallel with the basal plane and perpendicular to the maximum diameter A, and a maximum length C perpendicular to the basal plane,
   an average of the maximum diameters A ranges from 1 μm to 300 μm,
   an average ratio of the maximum diameter A to the maximum length C represented by A/C is at least 30,
   a content of the graphite fillers is 20 mass % to 40 mass %, and
   an average of a smaller angle made by the basal plane and a sheet surface of the sheet anisotropic heat conductive composition is 1° or more and less than 15°,
   an average ratio of the maximum diameter A to the maximum diameter B represented by A/B ranges from 1 to 20.

2. The anisotropic heat conductive composition according to claim 1, wherein the graphite fillers are obtained by heat-treating a high-polymer film.

3. The anisotropic heat conductive composition according to claim 2, wherein the high-polymer film is 10 μm to 400 μm in thickness.

4. The anisotropic heat conductive composition according to claim 2, wherein the high-polymer film is 10 μm to 20 μm in thickness.

5. The anisotropic heat conductive composition according to claim 1, wherein an average of the smaller angle made by the basal plane and the sheet surface of the sheet anisotropic heat conductive composition is 7° or more and 10° or less.

6. The anisotropic heat conductive composition according to claim 1, wherein a content of the graphite fillers is 30 mass % to 40 mass %.

* * * * *